US 6,651,989 B2

(12) United States Patent
Johnson

(10) Patent No.: US 6,651,989 B2
(45) Date of Patent: Nov. 25, 2003

(54) FIELD-ADJUSTABLE GASKET KIT

(75) Inventor: William A. Johnson, Naperville, IL (US)

(73) Assignee: Daana Corporation, Toledo, OH (US)

( * ) Notice: Subject to any disclaimer, the term of this patent is extended or adjusted under 35 U.S.C. 154(b) by 60 days.

(21) Appl. No.: 09/819,775

(22) Filed: Mar. 28, 2001

(65) Prior Publication Data

US 2002/0140178 A1 Oct. 3, 2002

(51) Int. Cl.⁷ ................................. F02F 11/00
(52) U.S. Cl. ..................................... 277/598
(58) Field of Search ..................... 277/313, 316, 277/592, 598, 609, 600, 630, 917; 29/888.3; 285/3, 4

(56) References Cited

U.S. PATENT DOCUMENTS

| | | | | |
|---|---|---|---|---|
| 1,398,612 A | * | 11/1921 | Victor ........................ 277/592 |
| 3,655,210 A | * | 4/1972 | Farnam et al. ............... 277/592 |
| 3,738,558 A | * | 6/1973 | Colwell ....................... 277/592 |
| 3,738,670 A | | 6/1973 | Jelinek et al. |
| RE28,201 E | * | 10/1974 | Hughes ......................... 55/367 |
| 4,078,287 A | * | 3/1978 | Kupchick ................ 29/898.11 |
| 4,163,137 A | * | 7/1979 | Close, Jr. .................. 200/302.3 |
| 4,400,000 A | * | 8/1983 | Moerk, Jr. ................... 277/598 |
| 4,572,522 A | | 2/1986 | Smagatz |
| 4,648,607 A | | 3/1987 | Yamada et al. |
| 4,690,413 A | | 9/1987 | Adkins |
| 4,746,023 A | * | 5/1988 | Belter ..................... 123/198 E |
| 4,803,307 A | * | 2/1989 | Shotey ........................ 174/67 |
| 4,813,687 A | * | 3/1989 | Nakayama et al. ......... 277/592 |
| 5,226,306 A | * | 7/1993 | Yoshino et al. ............... 72/313 |
| 5,236,203 A | | 8/1993 | Uchida et al. |
| 5,281,464 A | * | 1/1994 | Sekioka et al. ............. 277/598 |
| 5,303,943 A | * | 4/1994 | Batty, Jr. .................... 277/313 |
| 5,375,851 A | * | 12/1994 | Mockenhaupt .............. 277/598 |
| 5,433,455 A | | 7/1995 | Nelson |
| 5,651,338 A | * | 7/1997 | Pacheco et al. ........ 123/184.34 |
| 5,662,337 A | * | 9/1997 | Surbrook et al. ........... 277/593 |
| 5,882,013 A | * | 3/1999 | Genter et al. ............... 277/598 |
| 6,322,083 B1 | * | 11/2001 | Dowd et al. ................ 277/590 |
| 6,409,178 B1 | * | 6/2002 | Raden et al. ............... 277/317 |

FOREIGN PATENT DOCUMENTS

GB        1541690        * 3/1979

* cited by examiner

Primary Examiner—Anthony Knight
Assistant Examiner—Alison K. Pickard
(74) Attorney, Agent, or Firm—Rader, Fishman & Grauer, PLLC

(57) ABSTRACT

A multiple layer gasket adapted for sealing between mated surfaces of rigid members, said surfaces containing a plurality of spaced apart apertures; said gasket provided in kit form for use by aftermarket racing engine builders. In one preferred embodiment, the kit comprises a combustion gasket, and includes at least three loose, unriveted combustion gasket layers. All three layers contain combustion apertures but only the outer layers include fluid apertures. A center layer is designed as a fluid flow-metering layer of the gasket, and includes stenciled cutouts for the fluid apertures, the center layer being adapted for alignment with at least a portion of the first or top layer. Specific locations and shapes of apertures in the center layer are to be created in the field (i.e. at racing site). Finally, in one preferred embodiment, the layers may be doweled to be more easily mated together during installation in an engine.

7 Claims, 1 Drawing Sheet

FIELD-ADJUSTABLE GASKET KIT

BACKGROUND OF THE INVENTION

1. Field of Invention

The present invention relates to improved automotive gasket assemblies for internal combustion engines, and more particularly to (a) improved combustion cylinder head gaskets applied between engine block and cylinder head structures of said engines, and (b) to their methods of manufacture and use.

2. Description of the Prior Art

Those skilled in the art will appreciate that motivation for preserving secrecy in racing engine design parameters, generally among industry participants such as NASCAR, and particularly among the ranks of professional racing engine builders, is on the increase. To the extent that competition among racing engine participants will grow as the industry continues to grow, proprietary designs employed in racing engine gaskets are more likely to be more vigorously guarded in the foreseeable future than ever before.

Most traditional prior art engine gaskets, and particularly cylinder head gaskets associated with sealing combustion related parts of an engine, have often been manufactured by gasket makers under secrecy agreements. Such secrecy arrangements, however, are not always reliable, and as employees have moved from one venue to another, the secrets have often tended to become public knowledge sooner than later.

As a result, traditional gasket manufacturing techniques have been subject to being shared readily among industry participants, and it has been particularly difficult to assure secrecy for substantial periods of time.

SUMMARY OF THE INVENTION

The present invention is a gasket for sealing between mated surfaces, such as between an engine block and a cylinder head. In one preferred form, a multiple layer gasket is adapted for sealing between mated surfaces of rigid members, said surfaces containing a plurality of spaced apart apertures. The gasket, suited for being provided in kit form for use by aftermarket racing engine builders, is of a design that particularly lends itself to secrecy. For example, the oil and water apertures of the gasket remain unformed, and are hence blocked and unrevealed to the gasket manufacture. Desired configurations of the fluid apertures can be later established and formed at the racing site, under secret or proprietary specifications of a particular racing engine builder, thus assuring appropriate proprietary protection for any competitive advantage realized.

In one preferred embodiment, the kit comprises a plurality of combustion gasket pieces; specifically three loose, unriveted, hence disconnected, cylinder head gasket layers, wherein all three layers contain combustion and bolt apertures, and only the outer layers include fluid apertures. A center layer is designed as a fluid flow-metering layer of the gasket, and includes stenciled or etched cutouts for the cutting, punching, or drilling of fluid apertures, the center layer being adapted for alignment with at least a boundary portion of the first or top layer.

Specific locations and shapes of apertures in the center layer are to be created in the field (i.e. at racing site) for reasons of proprietary secrecy. The invention contemplates, however, that the stenciled or etched cutouts provided on at least one side of the center layer might in some cases be suggested, rather than actual, areas of said cutting, punching, or drilling of desired aperture locations. Finally, in one preferred embodiment, the layers are doweled so as to be fastened together upon installation in an engine. In the latter instance, the center layer also includes apertures adapted to receive dowel pins during installation of the gasket in the field.

DETAILED DESCRIPTION OF THE PREFERRED EMBODIMENTS

Figure 1:
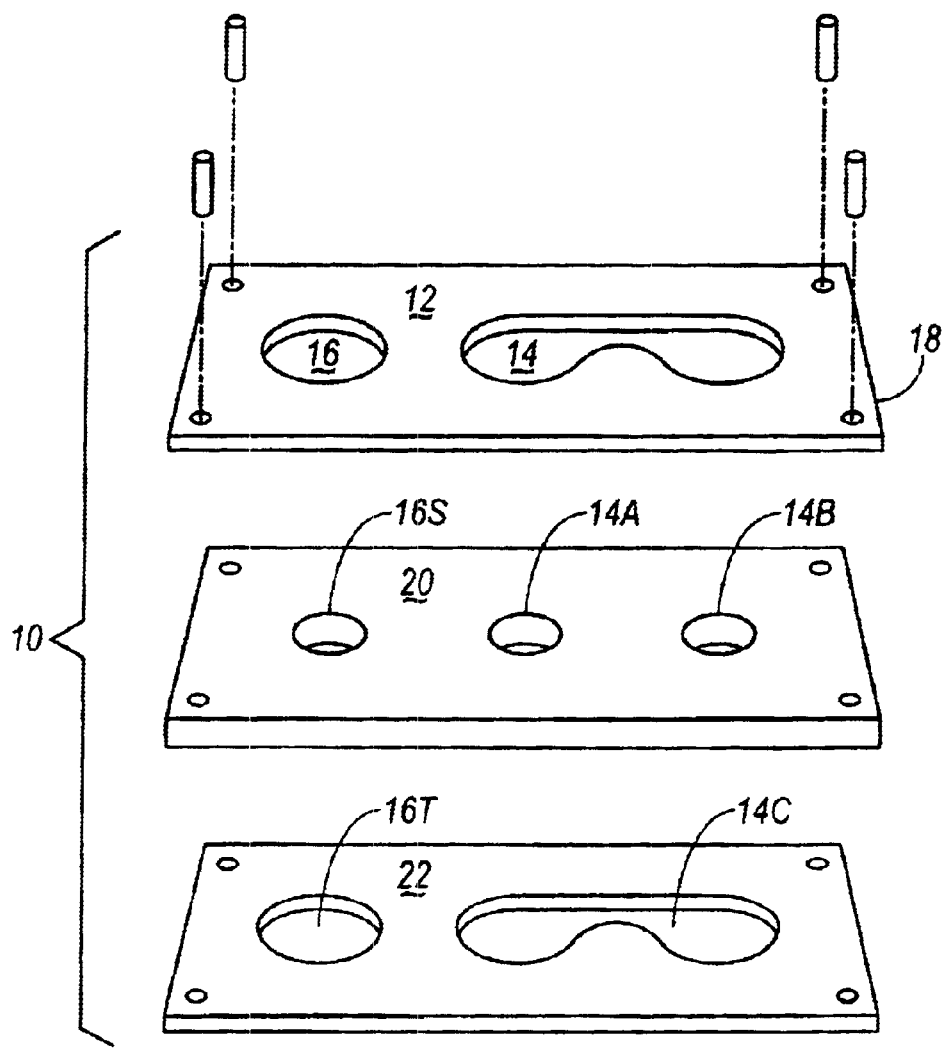
FIG. 1 is an exploded perspective view of one preferred embodiment of a fragmentary portion of a gasket kit constructed in accordance with the present invention.

Referring initially to FIG. 1, preferred embodiment of a gasket kit 10 manufactured in accordance with this invention includes a top layer 12 having apertures for both combustion openings (not shown) as well as fluid apertures 14 and 16. In the embodiment shown, the fluid aperture 16 is for water, while the fluid aperture 14 is adapted for the passage of oil. The top layer 12 includes a peripheral boundary portion 18 dimensioned and adapted for mating alignment with a second or intermediate layer 20. In the preferred embodiment as described herein, the second layer 20 is a central layer which is interposed between the top layer 12, and a third bottom layer (not shown) identical to the top layer 12.

Figure 2:
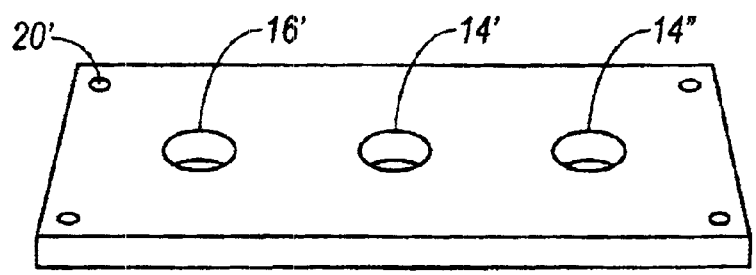
FIG. 2 is a flow layer of the gasket of FIG. 1 after apertures have been formed in the field, subsequent to manufacture of said kit.

Now referring to FIG. 2, those skilled in the art will appreciate that the layer 20 becomes layer 20' after apertures have been formed in the field by engine builders. The layer 20' includes an aperture 16' which corresponds to the aperture 16 of the top layer 12. Correspondingly, apertures 14' and 14" mate with the aperture 14 of the top layer 12. Thus, apertures 14', 14", and 16' are contemplated to be drilled at a field racing site by an engine builder. In the contemplated practice of this invention, a builder of racing engines will selectively choose where he or she wishes to cut, drill, punch, laser burn, or water jet openings in the intermediate or flow layer 20.

For this purpose, the layer 20 is manufactured with either stenciled or etched aperture patterns or indicia 16S, 14A and 14B, as shown, which correspond to the subsequently drilled apertures 16', 14', and 14" of layer 20'. Although the etched aperture patterns are included in the manufactured layer 20, this invention further contemplates that in some cases the aperture patterns will be mere suggestions, and in any case, the engine builder will be at complete liberty to design his or her own aperture patterns for optimal performance based on his or her own experience. This invention therefore provides a means by which an engine builder may retain his or her own proprietary information, apart from any given gasket manufacturer's specifications for a given gasket, even if manufactured for that particular engine builder.

As noted, in the preferred embodiment described, there is a bottom or third layer (not shown); thus, the gasket kit 10 provides three layers of gasket material, preferably steel, as described herein, for use as a combustion cylinder head gasket in a racing engine. As such, the kit provides material for fabrication of a three-layer, so-called multiple layer steel, or MLS, gasket. The top and bottom layers provide fluid and combustion sealing apertures at the time of manufacture of the gasket layers. The intermediate layer 20 in the embodiment presented herein, however, is a sheet of flat steel of approximately 1/16 of an inch thick, for example, complete with bolt apertures (not shown), dowel apertures (not shown), and combustion openings (not shown). To the extent that the intermediate layer 20' will be modified by the engine builder to include oil and water fluid flow apertures 16', 14', and 14", the latter apertures will have sizes and locations which may be retained as proprietary information by the engine builder.

Although the center layer 20, depending on engine builder requirements, may include a stenciled outline of the open deck of the relevant engine block (not shown) on one side, and the casting pattern of the cylinder head on the other side, such stenciled information is optional, and may not necessarily be desired by some engine builders. Moreover, some engine builders may desire that such information be etched or stenciled only on one side of the gasket layer 20.

Finally, in the particularly harsh environment of racing engines, it is contemplated that the layers 12 and 20 will be formed of stainless-steel material for assuring combustion environment durability. One preferred method for the engine builders to complete the fabrication of such a multilayer gasket from a kit, particularly adapted for maintaining proprietary gasket flow performance data with an engine builder, comprises the following steps:

a) providing a kit having at least a pair of gasket layers, one having preformed apertures, the second having stenciled indicia for field adjustable placement of apertures, said second layer being adapted for alignment with at least a boundary portion of said first layer;

b) selecting several of said indicia for forming apertures in said second layer based upon location and sizing thereof for optimal flow control;

c) forming apertures at said locations of said selected indicia;

d) mating said layers together via dowel pins to align said second layer with said portion of said boundary of said first layer.

In its preferred form, the gasket kit 10 may be manufactured and shipped as three loose layers, particularly to the extent that dowel pin apertures will provide the opportunity for securing the layers together via dowel pins rather than rivet for proper installation in an engine. As such, there will be no need to rivet the gasket layers together prior to shipping.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. A multiple layer gasket adapted for sealing between two mated surfaces of rigid members, said surfaces each containing a plurality of spaced apart apertures; said gasket comprising:

a) a first layer having a boundary and a plurality of preformed apertures adapted for alignment with said spaced apart apertures in said surfaces;

b) a second layer adapted for alignment with at least a portion of said first layer, said second layer comprising indicia for apertures to be formed in said layer just prior to installation of said multiple layer gasket; and c) a third layer having apertures identical to said apertures of said first layer, said second layer intermediately positioned between said first and said third layers; and wherein said second layer is adapted for alignment of at least a portion of said boundary of said first layer, wherein said indicia for apertures is stenciled on at least one surface of said second layer, and wherein said first and second layers are formed of a metallic material.

2. The gasket of claim 1 wherein said gasket comprises a combustion cylinder head gasket.

3. The gasket of claim 2 wherein said preformed apertures comprise combustion and fluid apertures.

4. The gasket of claim 3 wherein said fluid apertures comprise oil and water apertures.

5. The gasket of claim 4 wherein said second layer comprises a system for achievement of optimal performance for a racing engine.

6. The gasket of claim 5 wherein said first, second, and third layers are adapted to be doweled together.

7. The gasket of claim 6 wherein said stenciled indicia of said second layer provides a plurality of choices of apertures to be formed in said second layer prior to installation of said gasket into said engine.

* * * * *

UNITED STATES PATENT AND TRADEMARK OFFICE
CERTIFICATE OF CORRECTION

PATENT NO. : 6,651,989 B2  Page 1 of 1
DATED : November 25, 2003
INVENTOR(S) : William A. Johnson It is certified that error appears in the above-identified patent and that said Letters Patent is hereby corrected as shown below:

<u>Title page,</u>
Item [73], please change the assignee information from "Daana Corporation" to
-- Dana Corporation --.

Signed and Sealed this

Sixteenth Day of March, 2004

JON W. DUDAS
*Acting Director of the United States Patent and Trademark Office*